(12) United States Patent
Kuri

(10) Patent No.: US 10,760,962 B2
(45) Date of Patent: Sep. 1, 2020

(54) LIGHT DETECTOR, CORRECTION COEFFICIENT CALCULATION DEVICE, AND CORRECTION COEFFICIENT CALCULATION METHOD

(71) Applicant: Seiko Epson Corporation, Tokyo (JP)

(72) Inventor: Ryohei Kuri, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/232,121

(22) Filed: Dec. 26, 2018

(65) Prior Publication Data

US 2019/0195687 A1 Jun. 27, 2019

(30) Foreign Application Priority Data

Dec. 27, 2017 (JP) ................. 2017-251890

(51) Int. Cl.
*G01J 1/44* (2006.01)
*G01J 3/28* (2006.01)
*G01J 3/26* (2006.01)

(52) U.S. Cl.
CPC . *G01J 1/44* (2013.01); *G01J 3/26* (2013.01); *G01J 3/28* (2013.01); *G01J 3/2803* (2013.01); *G01J 2001/444* (2013.01)

(58) Field of Classification Search
CPC ........ G01J 1/44; G01J 3/26; G01J 3/28; G01J 3/2803; G01J 2001/444
See application file for complete search history.

(56) References Cited

U.S. PATENT DOCUMENTS

2012/0300303 A1   11/2012  Kuri
2018/0073923 A1*   3/2018  Inoue .................... G01J 3/2803

FOREIGN PATENT DOCUMENTS

JP         2012-247286 A    12/2012

* cited by examiner

*Primary Examiner* — Georgia Y Epps
*Assistant Examiner* — Don J Williams
(74) *Attorney, Agent, or Firm* — Harness, Dickey & Pierce, P.L.C.

(57) ABSTRACT

A spectroscopic measurement device includes a light receiving element that receives light and outputs a light receiving signal, a variable amplification circuit that amplifies the light receiving signal which is input, and a dark voltage correction unit that calculates a correction coefficient that is a rate of change of a dark voltage value with respect to gains, based on an output value of the variable amplification circuit with each value of two or more gains which are equal to or greater than a predetermined value in an environment where no light is incident on the light receiving element.

5 Claims, 6 Drawing Sheets

LIGHT DETECTOR, CORRECTION COEFFICIENT CALCULATION DEVICE, AND CORRECTION COEFFICIENT CALCULATION METHOD

BACKGROUND

1. Technical Field

The present invention relates to a light detector, a correction coefficient calculation device, and a correction coefficient calculation method.

2. Related Art

In the related art, there is a light detector that irradiates a workpiece with measurement light and detects light reflected by the workpiece with a light receiving element to perform various processes such as measurement and capturing of the workpiece (see, for example, JP-A-2012-247286). In such a light detector, a current signal outputted from a light receiving element according to an amount of received light is converted into a voltage signal by an IV conversion circuit, and the voltage signal is amplified by an amplification circuit and then converted into a digital signal by an AD converter.

In a spectroscopic measurement device disclosed in JP-A-2012-247286, a variable amplification circuit having gain switching function is used as the amplification circuit described above. The set gain of the variable amplification circuit is adjusted so that the amplified voltage signal matches the dynamic range of the AD converter. As a result, a conversion error is reduced in the AD converter.

In general, in order for a light detector to accurately measure an amount of received light of a light receiving element, correction is performed by subtracting dark voltage value from voltage signal value (output value of amplification circuit) that is amplified by an amplification circuit. The dark voltage value is a voltage value outputted from the amplification circuit based on a minute current (dark current) outputted from the light receiving element in a dark environment where no light is incident on the light receiving element.

However, a phenomenon that an output value with respect to a minute input voltage is collapsed (offset) occurs, when a low gain is set particularly in a variable amplification circuit, as described in JP-A-2012-247286. That is, when the variable amplification circuit amplifies a dark voltage which is a minute input voltage, a correct value may not be outputted depending on the set gain.

The collapse phenomenon of the dark voltage as described above becomes an error during correcting in which a dark voltage value is subtracted from an output value of the variable amplification circuit, thus deteriorating the detection accuracy of the light detector. In order to avoid the error, it is necessary to limit the range of the gains set in the variable amplification circuit, but in this case, dynamic range of the light detector is limited.

In addition, the problem described above is a problem that occurs when a general-purpose operational amplifier capable of handling signals only in a limited range of power supply voltage is used as an operational amplifier constituting the variable amplification circuit. When a rail-to-rail operational amplifier capable of handling signals over entire range of the power supply voltage is used, this problem can be solved, but in this case, the cost is significantly increased.

SUMMARY

An advantage of some aspects of the invention is to provide a light detector having a wide dynamic range and high accuracy even when a general-purpose operational amplifier is used for a variable amplification circuit, and a correction coefficient calculation device and a correction coefficient calculation method for correcting the dark voltage value in the light detector.

A light detector according to an aspect of the invention includes a light receiving element that receives light and outputs a light receiving signal, a variable amplification circuit that amplifies the light receiving signal which is input, and a dark voltage correction unit that calculates a correction coefficient that is a rate of change of a dark voltage value with respect to gains, based on an output value of the variable amplification circuit with each value of the two or more gains which are equal to or greater than a predetermined value in an environment where no light is incident on the light receiving element.

In the aspect of the invention, a dark voltage value corresponding to the gain set in the variable amplification circuit can be corrected by using a correction coefficient calculated by a dark voltage correction unit. For example, the corrected dark voltage value is calculated by multiplying the gain set in the variable amplification circuit by the correction coefficient. By using such a corrected dark voltage value, even when the gain for variable amplification circuit is set as a low value, correction of subtracting the dark voltage value from the output value of the variable amplification circuit can be performed accurately. Therefore, it is unnecessary to limit the range of the gains set in the variable amplification circuit, and the wide dynamic range of the light detector can be set.

Therefore, according to the aspect of the invention, even when a general-purpose operational amplifier is used for a variable amplification circuit, a light detector with a wide dynamic range and high accuracy can be provided.

According to the aspect of the invention, the gain "equal to or greater than a predetermined value" set in the variable amplification circuit refers to a value at which the collapse phenomenon of the dark voltage as described above does not occur when the variable amplification circuit is configured using a general-purpose operational amplifier. For example, it is preferable to select a higher side gain (for example, 8× or higher) among a plurality of gains that can be set in the variable amplification circuit.

Further, according to the aspect of the invention, since a general-purpose operational amplifier can be used to construct the variable amplification circuit, the cost can be reduced as compared with the case of using a rail-to-rail operational amplifier.

In the light detector according to the aspect of the invention, it is preferable that the dark voltage correction unit calculates the correction coefficient based on the output value of the variable amplification circuit when a gain of the variable amplification circuit is set as each value of a first gain, a second gain, and a third gain equal to or greater than the predetermined value.

In the aspect of the invention with this configuration, it is possible to calculate a plurality of rates of change of the output values with respect to the gains using the output value of the variable amplification circuit when the gain of the variable amplification circuit is set as the each value of the first gain, the second gain, and the third gain, and calculate the average value of the plurality of rates of change as the correction coefficient or calculate the rate of change obtained by the least squares method based on the plurality of rates of changes as the correction coefficient. As a result, a more appropriate correction coefficient can be calculated.

A light detector according to another aspect of the invention includes a light receiving element that receives light and outputs a light receiving signal, a variable amplification circuit that amplifies the light receiving signal which is input, a storage unit that stores at least one of a correction coefficient that is a rate of change of a dark voltage value, or a dark voltage table that correlates a corrected dark voltage value calculated based on the correction coefficient with a gain of the variable amplification circuit, and an output value correction unit that corrects the output value of the variable amplification circuit by using the correction coefficient or the dark voltage table.

In the aspect of the invention, the output value correction unit can accurately correct the output value of the variable amplification circuit by using the correction coefficient or the dark voltage table stored in the storage unit. As a result, even when a general-purpose operational amplifier is used for a variable amplification circuit, a light detector with a wide dynamic range and high accuracy can be provided.

A correction coefficient calculation device according to another aspect of the invention is connected to a light detector including a light receiving element that receives light and outputs a light receiving signal and a variable amplification circuit that amplifies the light receiving signal which is input, and the device includes an arithmetic operation unit that calculates a correction coefficient that is a rate of change of a dark voltage value with respect to gains, based on an output value of the variable amplification circuit with each value of the two or more gains which are equal to or greater than a predetermined value in an environment where no light is incident on the light receiving element.

According to the aspect of the invention, even when a general-purpose operational amplifier is used for the variable amplification circuit, a light detector with a wide dynamic range and high accuracy can be manufactured.

A correction coefficient calculation method according to another aspect of the invention includes measuring an output value of a variable amplification circuit with each value of the two or more gains which are equal to or greater than a predetermined value in an environment where no light is incident on the light receiving element, and calculating a correction coefficient that is a rate of change of a dark voltage value with respect to the gains based on the measured output value.

The correction coefficient calculation method according to the aspect of the invention may be implemented in a manufactured light detector or may be implemented to manufacture a light detector. According to such a method, even with a light detector using a general-purpose operational amplifier for a variable amplification circuit, it is possible to perform detection with a wide dynamic range and high accuracy.

A light detector according to another aspect of the invention includes a light receiver including a variable amplification circuit that amplifies a light receiving signal obtained by receiving light, and a dark voltage correction unit that calculates a correction coefficient for correcting a dark voltage value outputted by the light receiver in an environment where no light is incident on the light receiver, in which the dark voltage correction unit calculates a rate of change of the dark voltage value with respect to gains as the correction coefficient, based on a first dark voltage value which is the dark voltage value obtained when the gain of the variable amplification circuit is set as the first gain, and a second dark voltage value which is the dark voltage value obtained when the gain of the variable amplification circuit is set as the second gain.

In the aspect of the invention, the dark voltage value of the light receiver with respect to the gain of the variable amplification circuit can be corrected by using the correction coefficient calculated by the dark voltage correction unit. For example, the corrected dark voltage value is calculated by multiplying the gain of the variable amplification circuit by the correction coefficient. By using such a corrected dark voltage value, even when the gain for variable amplification circuit is set as a low value, correction of subtracting the dark voltage value from the output value of the light receiver can be performed accurately. Therefore, it is unnecessary to limit the range of the gains set in the variable amplification circuit, and a wide dynamic range of the light detector can be set.

Therefore, according to the aspect of the invention, even when a general-purpose operational amplifier is used for a variable amplification circuit, a light detector with a wide dynamic range and high accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
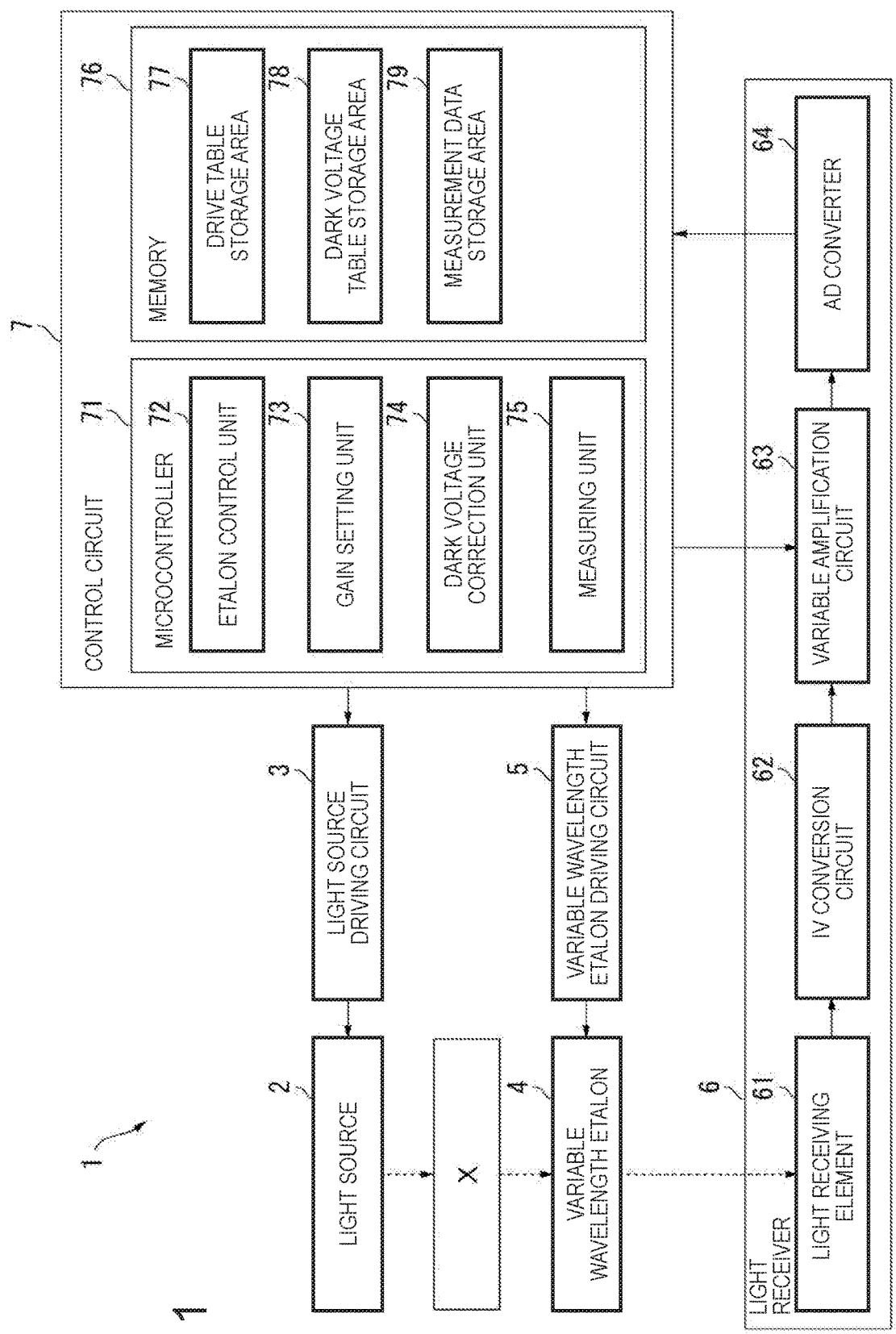
FIG. 1 is a block diagram showing a schematic configuration of a spectroscopic measurement device according to a first embodiment of the invention.

A first embodiment of the invention will be described with reference to the drawings. In the present embodiment, a spectroscopic measurement device which is an example of a light detector according to the invention will be described.
Configuration of Spectroscopic Measurement Device As shown in FIG. 1, a spectroscopic measurement device 1 is an apparatus that measures an amount of light of each wavelength in a measurement target light reflected by a measurement target object X, and includes a light source 2, a light source driving circuit 3, a variable wavelength etalon 4, a variable wavelength etalon driving circuit 5, a light receiver 6, and a control circuit 7.

The light source 2 has elements that convert electric signals of a plurality of LEDs or semiconductor lasers having different peak emission wavelengths into light, and is turned on, turned off, and dimmed by the light source driving circuit 3 controlled by a control circuit 7.

The variable wavelength etalon 4 has a pair of reflection films, an electrostatic actuator that changes a gap between the pair of reflection films, and the like, and transmits light having a predetermined wavelength among the measurement target light reflected by the measurement target object X according to the gap between the pair of reflection films.

The variable wavelength etalon driving circuit 5 changes the wavelength of the transmitted light by applying a driving voltage to an electrostatic actuator of the variable wavelength etalon 4 according to the control of the control circuit 7.

The light receiver 6 includes a light receiving element 61, an IV conversion circuit 62, a variable amplification circuit 63, and an AD converter 64.

The light receiving element 61 is a photoelectric conversion element such as a photodiode, and receives the light transmitted through variable wavelength etalon 4 and outputs a light receiving signal (current signal) corresponding to the amount of the received light.

The IV conversion circuit 62 includes an operational amplifier, a resistor, and a capacitor, and converts the light receiving signal outputted from light receiving element 61 from a current signal to a voltage signal.

The variable amplification circuit 63 is configured to include an inverting amplification circuit or a non-inverting amplification circuit using an operational amplifier and performs gain switching using an element such as a multiplexer. The variable amplification circuit 63 receives the light receiving signal (voltage signal) outputted from the IV conversion circuit 62 and amplifies the value of the light receiving signal. Here, as the operational amplifier constituting the variable amplification circuit 63, a general-purpose operational amplifier can be used.

The AD converter 64 converts the light receiving signal amplified by the variable amplification circuit 63 from an analog signal to a digital signal.

The control circuit 7 includes, for example, a microcontroller (microcomputer) 71 and a memory 76, and controls the overall operation of spectroscopic measurement device 1.

The microcomputer 71 serves as an etalon control unit 72, a gain setting unit 73, a dark voltage correction unit 74, and a measuring unit 75 by executing the program stored in a memory 76.

The memory 76 is a storage unit according to the invention and has a driving table storage area 77 and a dark voltage table storage area 78.

The driving table storage area 77 stores therein a driving table that correlates the driving voltage for the electrostatic actuator of the variable wavelength etalon 4 with the gap amount of the variable wavelength etalon 4 (or the wavelength of the light transmitted through the variable wavelength etalon 4).

The dark voltage table storage area 78 stores a correction coefficient a for calculating a corrected dark voltage value, and a dark voltage table that correlates the gain that can be set in the variable amplification circuit 63 with the corrected dark voltage value. The corrected dark voltage value is obtained by correcting the output value (dark voltage value) outputted from the light receiver 6 in dark environment where no light is incident on the light receiving element 61 by using the correction coefficient a.

The measurement data storage area 79 stores a table that correlates the measurement wavelength, gain of the variable amplification circuit 63, the output value of the light receiver 6, and the like, and the spectroscopic measurement result measured by the measuring unit 75, and the like.

The etalon control unit 72 controls an operation of the variable wavelength etalon driving circuit 5 with reference to the driving table stored in the driving table storage area 77.

The gain setting unit 73 controls switching of gain to be set in the variable amplification circuit 63, and sets the gain of variable amplification circuit 63 to a desired value. For example, the gain setting unit 73 adjusts the gain of the variable amplification circuit 63 so that the output voltage of the variable amplification circuit 63 matches the dynamic range of the AD converter 64.

The dark voltage correction unit 74 calculates a correction coefficient a, calculates a corrected dark voltage value using the correction coefficient a, or generates a dark voltage table that correlates gain that can be set in the variable amplification circuit 63 with the corrected dark voltage value.

The measuring unit 75 corresponds to the output value correction unit according to the invention, and corrects the output value of the light receiver 6 based on the dark voltage table stored in the dark voltage table storage area 78, and calculates an amount of the light (reflectance) having each wavelength transmitted through the variable wavelength etalon 4.

Dark Voltage Correction Method

Figure 2:
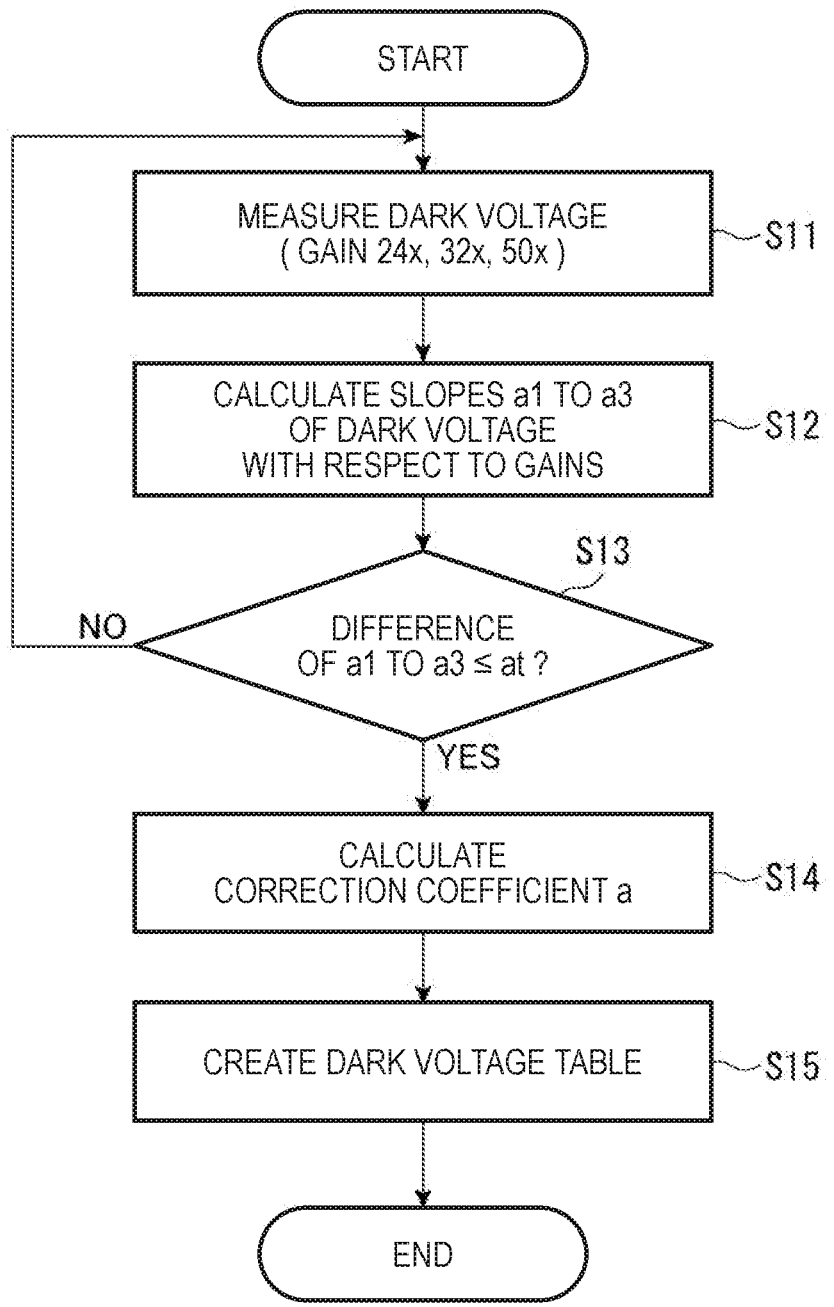
FIG. 2 is a flowchart showing a dark voltage correction method according to the embodiment.

According to the embodiment, the dark voltage is corrected before measurement when adjusting spectroscopic measurement device 1 or the like. The dark voltage correction method will be described with reference to a flowchart of FIG. 2.

First, after the dark environment is prepared where no light is incident on the light receiving element 61, the gain setting unit 73 sequentially switches gains of the variable amplification circuit 63, and the dark voltage correction unit 74 acquires the output value (dark voltage value) outputted from the light receiver 6, thereby measuring the dark voltage value (step S11; measuring step).

In step S11, the gain set in the variable amplification circuit 63 is equal to or greater than a predetermined value. The gain "equal to or greater than a predetermined value" refers to a value at which "collapse phenomenon of dark voltage" does not occur in the output value of the variable amplification circuit 63. For example, it is preferable to select a higher side gain (for example, 8× or higher) among a plurality of gains that can be set in the variable amplification circuit 63. According to the embodiment, eight kinds of gains can be set, which are, 1×, 2×, 4×, 8×, 16×, 24×, 32×, 50×, and in step S11, gains of 24× (first gain), 32× (second gain), 50× (third gain) are selected and set sequentially.

Next, the dark voltage correction unit 74 calculates a correction coefficient a based on the plurality of dark voltage values acquired in step S11 (steps S12 to S14; calculating step).

Specifically, in step S12, a slope (rate of change) a1 of the dark voltage value with respect to the gain is calculated, from the dark voltage value (first dark voltage value) obtained when the gain is set as 24× (first gain) and the dark voltage value (second dark voltage value) obtained when the gain is set as 32× (second gain). Similarly, a slope a2 of the dark voltage value with respect to the gain is calculated from the dark voltage value (second dark voltage value) obtained when the gain is 32× (second gain) and the dark voltage value (third dark voltage value) when the gain is 50× (third gain), a slope a3 of the dark voltage value with respect to the gain is calculated from the dark voltage value (third dark voltage value) obtained when the gain is set as 50× (third gain) and the dark voltage value (first dark voltage value) when the gain is set as 24× (first gain).

In step S13, with respect to the calculated slopes a1 to a3, it is determined whether a difference between values (for example, difference between a1 and a2, difference between a2 and a3, difference between a3 and a1) is within the threshold value at, and when the difference is within the threshold value at, the process proceeds to next step S14, and when the difference is greater than the threshold value at, the process returns to step S11.

In step S14, a value obtained by averaging the slopes a1 to a3 by Equation (1) below is set as a correction coefficient a and stored in the dark voltage table storage area 78.

$$a=(a1+a2+a3)/3 \qquad \text{Equation (1)}$$

Next, the dark voltage correction unit 74 calculates a product by multiplying each gain that can be set in variable amplification circuit 63 by the correction coefficient a, as the corrected dark voltage value which is the dark voltage value after correcting. Then, the dark voltage correction unit 74 generates a dark voltage table that correlates each gain of the variable amplification circuit 63 with the corrected dark voltage value, and stores the generated table in the dark voltage table storage area 78 (step S15).

With the steps S11 to S15 described above, the dark voltage correction is completed.

Figure 3:
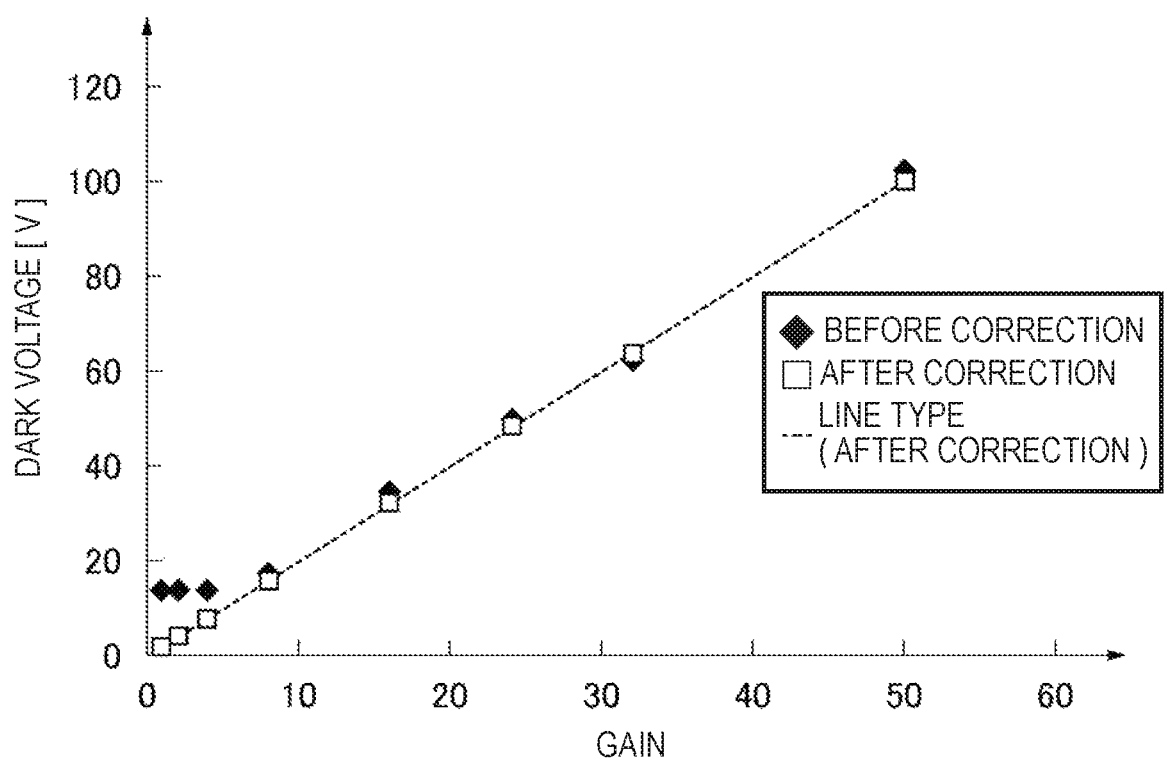
FIG. 3 is a graph showing a change in a dark voltage value with respect to gains of a variable amplification circuit before and after correction of the dark voltage value.

FIG. 3 shows the change of the dark voltage value with respect to the gain of variable amplification circuit 63 before and after the correction of the dark voltage described above.

As shown in FIG. 3, before the dark voltage is corrected, when the gain of the variable amplification circuit 63 is set as 1×, 2×, and 4×, the dark voltage value which is outputted from light receiver 6 is collapsed (offset), therefore the correct value cannot be acquired. Meanwhile, after the dark voltage is corrected, the dark voltage value with respect to the gain of the variable amplification circuit 63 is linearly changed. That is, the collapse phenomenon of the dark voltage that occurred before the correction is eliminated after the correction.

Spectroscopic Measurement Method

Figure 4:
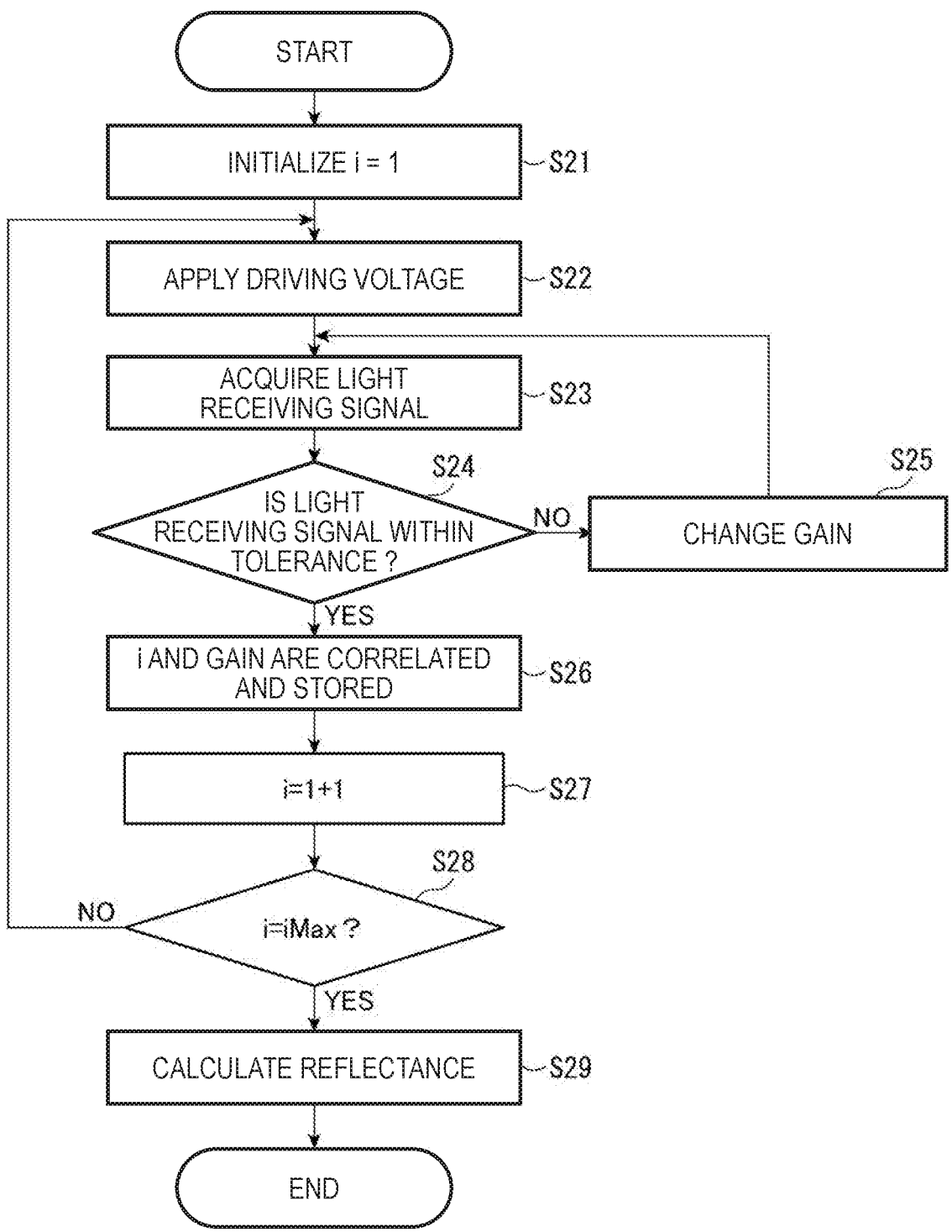
FIG. 4 is a flowchart showing a spectroscopic measurement method according to the embodiment.

The dark voltage table generated according to the embodiment is used at the time of spectroscopic measurement by the spectroscopic measurement device 1. The spectroscopic measurement method by the spectroscopic measurement device 1 will be described with reference to the flowchart of FIG. 4.

First, after the measuring unit 75 initializes variable i indicating the measurement wavelength (step S21), the etalon control unit 72 controls the variable wavelength etalon driving circuit 5 and applies the driving voltage that is set according to the variable i to the variable wavelength etalon 4 (step S22). As a result, among the reflected lights of the measurement target object X, the light having a wavelength corresponding to the variable i is transmitted through the variable wavelength etalon 4 to be incident on the light receiver 6.

Next, the measuring unit 75 acquires a light receiving signal from the light receiver 6 (step S23), and determines whether the output value of the acquired light receiving signal is within a tolerance (measurement range) (step S24). Here, when the output value of the light receiving signal is out of the tolerance (step S24; No), the gain setting unit 73 switches the gain of the variable amplification circuit (step S25), and then returns to step S23. The gain is switched by increasing the gain set in the variable amplification circuit 63 by one step when the output value of the light receiving signal is lower than the tolerance, and decreasing the gain by one step when the output value is higher than the tolerance.

When the output value of the light receiving signal is within the tolerance (step S24; Yes), the current variable i (measurement wavelength), the gain of the variable amplification circuit 63, the output value of light receiver 6, and the like are correlated and stored in the measurement data storage area 79 (step S26).

Thereafter, the measuring unit 75 counts up the variable i (step S27) and determines whether the current variable i is iMAX (that is, whether all the wavelengths to be measured are measured) (step S28). In step S28, when Yes, the process proceeds to step S29, and when No, the process returns to step S22.

In step S29, the measuring unit 75 calculates the amount of received light (reflectance R) for each measurement wavelength based on Equation (2) below. In Equation (2), X(i) denotes an output value of the light receiver 6 corresponding to each variable i (measurement wavelength), Xref is a reference output value obtained by measuring the reference white plate in advance, and D is a corrected dark voltage value.

$$R=(X(i)-D)/(X\text{ref}-D) \qquad \text{Equation (2)}$$

Here, the measuring unit 75 acquires the gain corresponding to each variable i (measurement wavelength) by referring to the measurement data storage area 79 and acquires the corrected dark voltage value D corresponding to the acquired gain by referring to the dark voltage table stored in the dark voltage table storage area 78. Then, the measuring unit 75 performs calculation of Equation (2) using the corrected dark voltage value D acquired from the dark voltage table. Further, in Equation (2), the correction is performed by subtracting the corrected dark voltage D by the output value of the light receiver 6 of each measurement time. By the above processing, spectroscopic measurement by the spectroscopic measurement device 1 is performed with high accuracy.

Effects of Embodiment

With the spectroscopic measurement device 1 according to the embodiment, the corrected dark voltage value corresponding to the gain to be set in the variable amplification circuit 63 is calculated based on the correction coefficient a calculated by the dark voltage correction unit 74. By using such a corrected dark voltage value, even when the gain for the variable amplification circuit 63 is set as a low value, the correction of subtracting the dark voltage value from the output value of the light receiver 6 can be performed accurately. Therefore, according to the embodiment, it is unnecessary to limit the range of the gains to be set in the variable amplification circuit 63, and a wide dynamic range of spectroscopic measurement device 1 can be set. As a result, even when the variable amplification circuit 63 is configured using a general-purpose operational amplifier, the spectroscopic measurement device 1 with a wide dynamic range and high accuracy can be provided.

Further, according to the embodiment, since a general-purpose operational amplifier can be used to construct variable amplification circuit 63, the cost can be reduced as compared with the case of using a rail-to-rail operational amplifier.

According to the embodiment, when each value of the three kinds of gains is set, slopes a1 to a3 of the dark voltage value with respect to the gain are calculated on the basis of the dark voltage value outputted from the variable amplification circuit 63, and the average value thereof is set as the correction coefficient a. Therefore, it is possible to calculate an appropriate correction coefficient a by a simple calculation.

Figure 5:
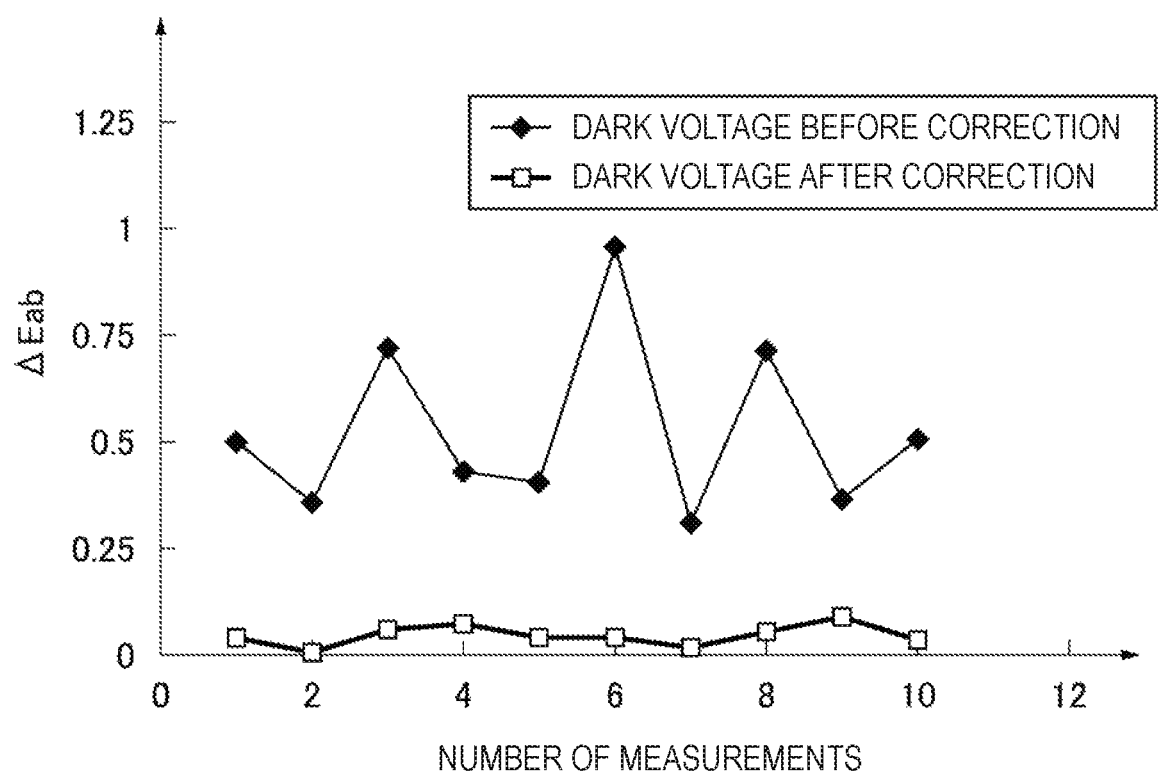
FIG. 5 is a graph showing results of repeating reproducibility test of white color measurement in Example and Comparative Example.

To describe the effect according to the embodiment, the results of repeating reproducibility test of white measurement are shown in FIG. 5. In this test, the spectroscopic measurement device 1 after performing the correction of the dark voltage according to the present embodiment is an Example (after dark voltage correction), and the spectroscopic measurement device 1 before performing the correction of the dark voltage is a Comparative Example (before dark voltage correction). In the graph shown in FIG. 5, ΔEab is the color difference with respect to the standard white.

As shown in FIG. 5, ΔEab after the dark voltage correction of the Example shows a value close to 0 in all of the 10 measurement results. Meanwhile, ΔEab before the dark voltage correction of the Comparative Example greatly varies between the values of 0 and 1 in the 10 measurement results. Therefore, it is revealed that, in the Example, the measurement accuracy is improved compared to the Comparative Example.

Second Embodiment

Figure 6:
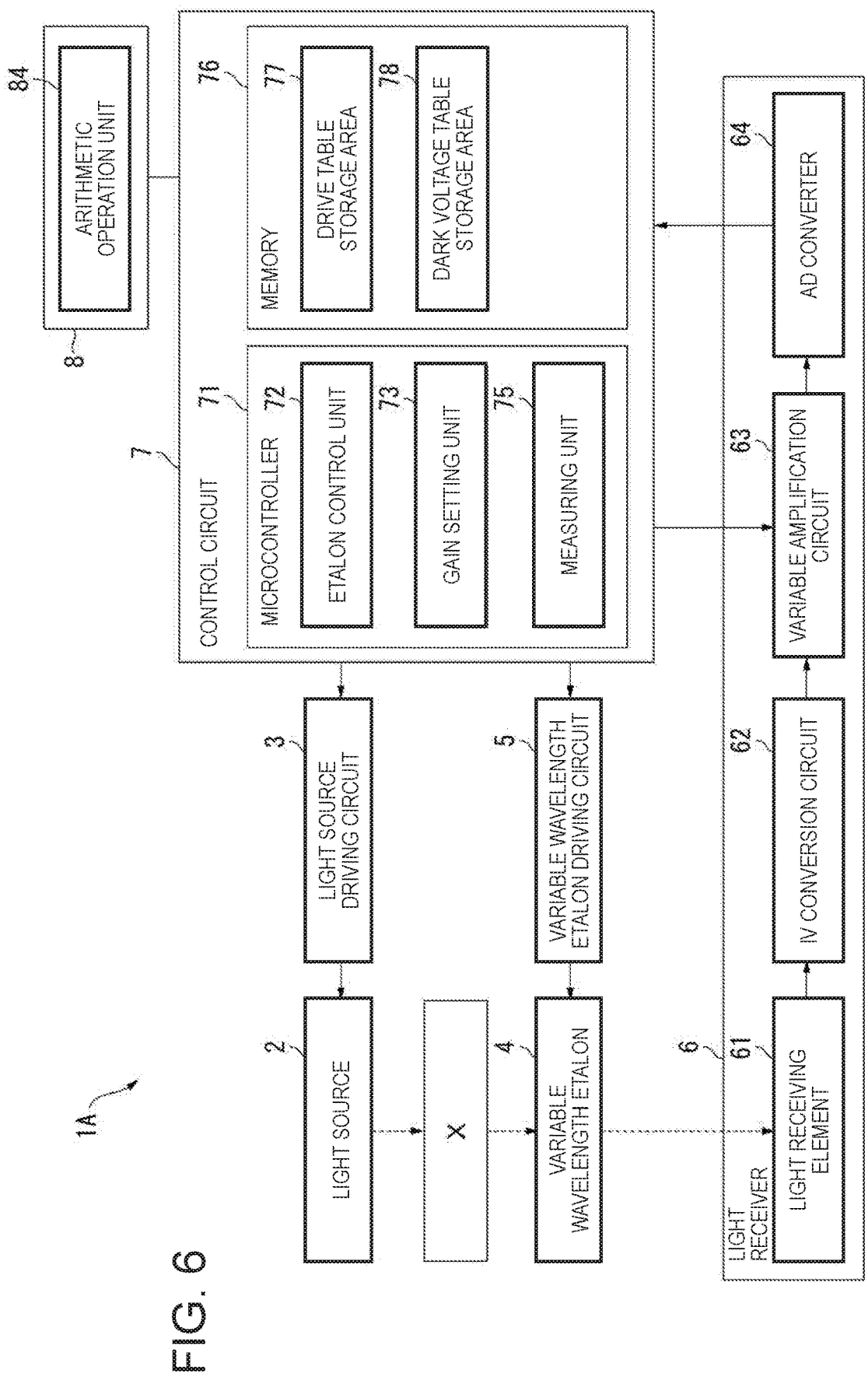
FIG. 6 is a block diagram showing a schematic configuration of a spectroscopic measurement device according to a second embodiment of the invention and a correction coefficient calculation device according to a third embodiment.

A spectroscopic measurement device 1A according to a second embodiment of the invention will be described with reference to FIG. 6. The same reference numerals are given to the same components as those of the first embodiment, and the explanation thereof will be simplified or not be repeated.

In the first embodiment, while the dark voltage correction unit 74 calculates the correction coefficient a and generates the dark voltage table, the spectroscopic measurement device 1A according to the second embodiment does not include such a dark voltage correction unit 74. That is, in the second embodiment, at the time of manufacturing the spectroscopic measurement device 1A, at least one of the correction coefficient a or the dark voltage table is stored in the dark voltage table storage area 78.

For example, when the dark voltage table is stored in the dark voltage table storage area 78, the measuring unit 75 can correct the output value of the light receiver 6 using the corrected dark voltage value acquired from the dark voltage table. In addition, when the correction coefficient a is stored in the dark voltage table storage area 78, the measuring unit 75 can calculate the corrected dark voltage value based on the correction coefficient a to correct the output value of the light receiver 6 using the corrected dark voltage value.

According to the present embodiment, similarly to the first embodiment, even when the variable amplification circuit 63 is constructed using a general-purpose operational amplifier, a spectroscopic measurement device 1A with a wide dynamic range and high accuracy can be provided.

Third Embodiment

Like the second embodiment, a correction coefficient calculation device 8 according to the third embodiment of the invention will be described with reference to FIG. 6. The same reference numerals are given to the same components as those of the first embodiment, and the explanation thereof will be simplified or not be repeated.

The correction coefficient calculation device 8 according to the embodiment includes an arithmetic operation unit 84 having the same function as that of the dark voltage correction unit 74 of the first embodiment. This correction coefficient calculation device 8 is connected to the spectroscopic measurement device 1A according to the second embodiment, for manufacturing the spectroscopic measurement device 1A. Then, the arithmetic operation unit 84 stores at least one of the correction coefficient a or the dark voltage table in the dark voltage table storage area 78 of the spectroscopic measurement device 1A by performing the dark voltage correction method described above.

According to the correction coefficient calculation device 8 according to the embodiment, it is possible to manufacture a spectroscopic measurement device 1A with a wide dynamic range and high accuracy.

Modification Example

In addition, the invention is not limited to the embodiments described above, and variations, improvements and the like within the scope of achieving the object of the invention are included in the invention.

According to the first embodiment, the dark voltage correction unit 74 calculates the correction coefficient a and generates the dark voltage table, but may calculate only the correction coefficient a. In this case, the measuring unit 75 may calculate the product of the correction coefficient a stored in the dark voltage table storage area 78 and the gain to be set in the variable amplification circuit 63 at the present time to calculate the corrected dark voltage value.

The correction coefficient calculation method according to the invention is not limited to the method described above in the first embodiment.

For example, in the first embodiment, variable amplification circuit 63 is sequentially set as three gains in step S11, but it is not limited as long as there are two or more gains. Further, the correction coefficient a may be calculated using the origin (output value when the gain is 0).

According to the embodiment, the correction coefficient a is calculated by averaging the slopes a1 to a3 of the dark voltage value with respect to the gain, but the correction coefficient a may be calculated by performing the least squares method based on the slopes a1 to a3 of the dark voltage values with respect to the gain.

In each of the embodiment described above, the dark voltage correction unit 74 obtains the correction coefficient a from the output value (dark voltage value) of the light receiver 6. That is, according to the invention, "calculating the correction coefficient based on the output value of the variable amplification circuit" is not limited only to calculating the correction coefficient using the output values of the variable amplification circuit 63 themselves, but includes calculating the correction coefficient a based on the result of processing the output values of the variable amplification circuit 63 (AD conversion processing by AD converter 64 in the embodiment).

Further, in each of the embodiments described above, when the output value of the variable amplification circuit 63 is configured to be input to the control circuit 7, the dark voltage correction unit 74 may directly obtain the correction coefficient a from the output value (dark voltage value) of the variable amplification circuit 63. In this case, the measuring unit 75 may correct the output value of variable amplification circuit 63 based on the correction coefficient a or dark voltage correction table to calculate the amount of the light (reflectance) having each wavelength transmitted through variable wavelength etalon 4.

While the spectroscopic measurement device 1, 1A of each embodiment described above includes the variable wavelength etalon 4 as a spectroscopic device for separating light of a predetermined wavelength from the measurement target light, the spectroscopic measurement device 1, 1A may include acousto-optically variable wavelength filter (AOTF) or liquid crystal tunable filter (LCTF), or other types of spectroscopic device as well.

The light detector according to the invention is not limited to the spectroscopic measurement device 1, 1A, but may be a device including a light receiving element and a variable amplification circuit for detecting light, such as an imaging device. Further, the correction coefficient calculation device according to the invention may be connected to a light detector such as an imaging device.

The entire disclosure of Japanese Patent Application No. 2017-251890 filed Dec. 27, 2017 is expressly incorporated herein by reference.

What is claimed is:

1. A light detector comprising:
  a light receiving element configured to receive light and output a light receiving signal;
  a variable amplification circuit configured to receive and amplify the light receiving signal so as to output amplified signals, the variable amplification circuit being configured to be selectable one of a plurality of gains;
  a memory configured to store a program; and
  a processor configured to execute the program so as to:
    select a first gain among the plurality of gains in the variable amplification circuit;
    obtain a first dark voltage value corresponding to one of the output amplified signals when the first gain is selected and no light is incident on the light receiving element;
    select a second gain different from the first gain among the plurality of gains in the variable amplification circuit;
    obtain a second dark voltage value corresponding to one of the output amplified signals when the second gain is selected and no light is incident on the light receiving element;
    calculate a first change rate between the first dark voltage value and the second dark voltage value;
    determine whether the first change rate is equal to or less than a threshold value; and
    obtain a correction coefficient based on the first change rate when the first change rate is equal to or less than the threshold value,
  wherein one of the output amplified signals is modified by the correction coefficient when the light is incident on the light receiving element.

2. The light detector according to claim 1,
  wherein the processor is configured to:
    select a third gain different from the first and second gains among the plurality of gains in the variable amplification circuit;
    obtain a third dark voltage value corresponding to one of the output amplified signals when the third gain is selected and no light is incident on the light receiving element;
    calculate a second change rate between the first dark voltage value and the third dark voltage value;
    calculate a third change rate between the second dark voltage value and the third dark voltage value;
    determine whether the second change rate is equal to or less than the threshold value;
    determine whether the third change rate is equal to or less than the threshold value;
    calculate an average change rate of the first, second, and third change rates when the first, second, and third change rates are equal to or less than the threshold value; and
    obtain the correction coefficient based on the average change rate.

3. A light detector comprising:
  a light receiving element configured to receive light and output a light receiving signal;
  a variable amplification circuit configured to receive and amplify the light receiving signal so as to output amplified signals, the variable amplification circuit being configured to be selectable one of a plurality of gains;
  a memory configured to store a program and at least one of a correction coefficient, or a dark voltage table that correlates a corrected dark voltage value calculated based on the correction coefficient with a predetermined gain of the plurality of gains in the variable amplification circuit; and
  a processor configured to execute the program so as to:
    select a first gain among the plurality of gains in the variable amplification circuit;
    obtain a first dark voltage value corresponding to one of the output amplified signals when the first gain is selected and no light is incident on the light receiving element;
    select a second gain different from the first gain among the plurality of gains in the variable amplification circuit;
    obtain a second dark voltage value corresponding to one of the output amplified signals when the second gain is selected and no light is incident on the light receiving element;
    calculate a first change rate between the first dark voltage value and the second dark voltage value;
    determine whether the first change rate is equal to or less than a threshold value; and
    read the correction coefficient from the memory when the first change rate is equal to or less than the threshold value,
  wherein one of the output amplified signals is modified by the correction coefficient or dark voltage table when the light is incident on the light receiving element.

4. A correction coefficient calculation device connected to a light detector, the light detector including:
    a light receiving element configured to receive light and output a light receiving signal, and
    a variable amplification circuit configured to receive and amplify the light receiving signal, the correction coefficient calculation device comprising:
  a memory configured to store a program; and
  a processor configured to execute the program so as to:
    select a first gain among the plurality of gains in the variable amplification circuit;
    obtain a first dark voltage value corresponding to one of the output amplified signals when the first gain is selected and no light is incident on the light receiving element;
    select a second gain different from the first gain among the plurality of gains in the variable amplification circuit;

obtain a second dark voltage value corresponding to one of the output amplified signals when the second gain is selected and no light is incident on the light receiving element;

calculate a first change rate between the first dark voltage value and the second dark voltage value;

determine whether the first change rate is equal to or less than a threshold value; and obtain a correction coefficient based on the first change rate when the first change rate is equal to or less than the threshold value, wherein one of the output amplified signals is modified by the correction coefficient when the light is incident on the light receiving element.

5. A correction coefficient calculation method for causing a processor to execute a program stored in a memory, the method comprising executing on the processor the steps of:

providing a light receiving signal when a light receiving element is configured to receive light;

receiving and amplifying the light receiving signal so as to output amplified signals by a variable amplification circuit, the variable amplification circuit being configured to be selectable one of a plurality of gains;

selecting a first gain among the plurality of gains in the variable amplification circuit;

obtaining a first dark voltage value corresponding to one of the output amplified signals when the first gain is selected and no light is incident on the light receiving element;

selecting a second gain different from the first gain among the plurality of gains in the variable amplification circuit;

obtaining a second dark voltage value corresponding to one of the output amplified signals when the second gain is selected and no light is incident on the light receiving element, calculating a first change rate between the first dark voltage value and the second dark voltage value;

determining whether the first change rate is equal to or less than a threshold value; and obtaining a correction coefficient based on the first change rate when the first change rate is equal to or less than the threshold value, wherein one of the output amplified signals is modified by the correction coefficient when the light is incident on the light receiving element.

* * * * *